(12) United States Patent
Lee et al.

(10) Patent No.: US 11,438,203 B2
(45) Date of Patent: Sep. 6, 2022

(54) METHOD FOR TRANSMITTING OR RECEIVING SIGNAL IN WIRELESS COMMUNICATION SYSTEM AND DEVICE THEREFOR

(71) Applicant: LG Electronics Inc., Seoul (KR)

(72) Inventors: Sangrim Lee, Seoul (KR); Hojae Lee, Seoul (KR); Kijun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 425 days.

(21) Appl. No.: 16/334,655

(22) PCT Filed: Sep. 8, 2017

(86) PCT No.: PCT/KR2017/009895
§ 371 (c)(1),
(2) Date: Mar. 19, 2019

(87) PCT Pub. No.: WO2018/062717
PCT Pub. Date: Apr. 5, 2018

(65) Prior Publication Data
US 2021/0281455 A1    Sep. 9, 2021

Related U.S. Application Data

(60) Provisional application No. 62/406,003, filed on Oct. 10, 2016, provisional application No. 62/401,946, filed on Sep. 30, 2016.

(51) Int. Cl.
*H04L 27/00* (2006.01)
*H04W 72/04* (2009.01)
(Continued)

(52) U.S. Cl.
CPC ...... *H04L 27/2607* (2013.01); *H04L 27/0008* (2013.01); *H04W 72/042* (2013.01); *H04W 74/0833* (2013.01)

(58) Field of Classification Search
CPC ... H04L 1/0003; H04L 1/0004; H04L 1/0005; H04L 1/0009; H04L 1/001; H04L 1/0011;
(Continued)

(56) References Cited

U.S. PATENT DOCUMENTS

2009/0274077 A1   11/2009   Meylan et al.
2010/0034152 A1   2/2010    Imamura
(Continued)

FOREIGN PATENT DOCUMENTS

CN   101114874   1/2008
CN   102065054   5/2011
(Continued)

OTHER PUBLICATIONS

Qualcomm Incorporated, "Waveform proposal for >6GHz," R1-166353, 3GPP TSG-RAN WG1 #86, Gothenburg, Sweden, Aug. 22-26, 2016, 5 pages.
(Continued)

*Primary Examiner* — Hoon J Chung
(74) *Attorney, Agent, or Firm* — Fish & Richardson P.C.

(57) ABSTRACT

A method for transmitting an uplink signal by a terminal in a wireless communication system according to an embodiment of the present invention comprises the steps of: receiving information indicating one of a cyclic prefix-orthogonal frequency divisional multiplexing (CP-OFDM) scheme and a discrete Fourier transform-spreading-OFDM (DFT-s-OFDM) scheme from a base station; generating a waveform of an uplink signal according to the indicated scheme; and transmitting the generated waveform of the uplink signal to the base station, wherein modulation of the uplink signal by a terminal through a modulation scheme having a lowest modulation order may be allowed only when the waveform of the uplink signal is generated by the DFT-s-OFDM scheme.

15 Claims, 15 Drawing Sheets

(51) Int. Cl.
 *H04W 74/08* (2009.01)
 *H04L 27/26* (2006.01)
(58) Field of Classification Search
 CPC ............ H04L 27/0008; H04W 72/042; H04W 74/0833
 See application file for complete search history.

(56) References Cited

U.S. PATENT DOCUMENTS

| | | | |
|---|---|---|---|
| 2010/0315964 A1 | 12/2010 | Kim et al. | |
| 2015/0092528 A1 | 4/2015 | Luo et al. | |
| 2017/0223743 A1* | 8/2017 | Lin | H04L 27/2607 |
| 2018/0116000 A1* | 4/2018 | Ly | H04W 74/0833 |
| 2019/0239123 A1* | 8/2019 | Kim | H04W 88/023 |

FOREIGN PATENT DOCUMENTS

| | | | | |
|---|---|---|---|---|
| CN | 102119552 | | 7/2011 | |
| CN | 102598638 | | 7/2012 | |
| CN | 104205696 | | 12/2014 | |
| WO | WO2010000309 | | 1/2010 | |
| WO | WO2014076004 | | 5/2014 | |
| WO | WO2016086144 | | 6/2016 | |
| WO | WO2016130175 | | 8/2016 | |
| WO | WO2018/203707 A1 * | 11/2018 | | H04W 52/36 |

OTHER PUBLICATIONS

Qualcomm Incorporated, "Waveform Candidates," R1-162199, 3GPP TSG-RAN WG1 #84b, Busan, Korea, Apr. 11-15, 2016, 26 pages.
Qualcomm Incorporated, "OFDM and SC-FDM Support for Uplink," R1-166354, 3GPP TSG-RAN WG1 #86, Gothenburg, Sweden, Aug. 22-26, 2016, 6 pages.
PCT International Search Report and Written Opinion in International Application No. PCT/KR2017/009895, dated Dec. 12, 2017, 29 pages (with English translation).
Extended European Search Report in European Application No. 17856603.0, dated Apr. 20, 2020, 8 pages.
Panasonic, "NR waveform evaluation and proposals," R1-167337, 3GPP TSG RAN WG1 Meeting #86, Gothenburg, Sweden, dated Aug. 22-26, 2016, 21 pages.
Intel Corporation, "Overview of new radio access technology requirements and designs," R1-162379, 3GPP TSG RAN WG1 Meeting #84bis, Busan, Korea, dated Apr. 11-15, 2016, 4 pages.
Korean Notice of Allowance in Korean Application No. 10-2019-7004950, dated Oct. 7, 2020, 3 pages (with English translation).
RAN1, "LS on RAN1 agreements for NR initial access and mobility," R1-168214, 3GPP TSG RAN1 Meeting #86, Gothenburg, Sweden, dated Aug. 22-26, 2016, 3 pages.
RAN1, "LS on RAN1 agreements for NR initial access and mobility," R2-166005, 3GPP TSG RAN WG2 Meeting #95bis, Kaohsiung, dated Oct. 10-14, 2016, 3 pages.
CN Office Action in Chinese Appln. No. 201780057864.9, dated Feb. 25, 2021, 37 pages (with English translation).
Bertrand & Jiang, "Random Access," LTE-The UMTS Long Term Evolution: From Theory to Practice, 2009, 19:421-456.
Lenovo, "Random Access Procedure for NB-IoT," R1-161009, Presented at 3GPP TSG RAN WG1 Meeting #84, St Julian's, Malta, Feb. 15-19, 2016, 4 pages.
Office Action in Chinese Appln. No. 201780057864.9, dated Mar. 2, 2022, 15 pages (with English translation).
Office Action in European Appln. No. 17856603.0, dated Apr. 11, 2022, 7 pages.

* cited by examiner

METHOD FOR TRANSMITTING OR RECEIVING SIGNAL IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2017/009895, filed Sep. 8, 2017, which claims the benefit of U.S. Provisional Application Ser. No. 62/406,003, filed on Oct. 10, 2016, and U.S. Provisional Application Ser. No. 62/401,946, filed on Sep. 30, 2016. The disclosures of the prior applications are incorporated by reference in their entirety.

TECHNICAL FIELD

The present disclosure relates to a wireless communication system, and more particularly to, methods of transmitting and receiving uplink signals between a user equipment and a base station and devices therefor.

BACKGROUND ART

As a number of communication devices have required much higher communication capacity, scenarios for the next generation communication system (e.g., 5G or new RAT) have been discussed in recent years. For example, Enhanced Mobile BroadBand (eMBB), Ultra-reliable Machine-Type Communications (uMTC), and Massive Machine-Type Communications (mMTC) are included in the scenarios. The eMBB corresponds to a next generation mobile communication scenario characterized by high spectrum efficiency, high user experienced data rates, high peak data rates, etc. The uMTC corresponds to a next generation mobile communication scenario characterized by ultra-high reliability, ultra-low latency, ultra-high availability, etc. For example, the uMTC may include V2X, emergency services, remote control, etc. The mMTC corresponds to a next generation mobile communication scenario characterized by low cost, low energy, short packets, massive connectivity, etc. For example, the mMTC may include Internet of Things (IoT).

FIG. 1 illustrates relation between core performance requirements for 5G, which are proposed in IMT 2020, and 5G performance requirements for each service scenario. In particular, uMTC services have extremely restricted Over-The-Air (OTA) latency requirements and requires high mobility and reliability (e.g., OTA Latency <1 ms, Mobility >500 km/h, and BLER <$10^{-6}$).

For the next generation wireless communication, new Radio Access Technology (RAT) considering the eMBB, mMTC, URLCC, etc. has been discussed.

DISCLOSURE OF THE INVENTION

Technical Task

The object of the present disclosure is to provide a method of transmitting or receiving an uplink signal efficiently and accurately in a wireless communication system supporting both a Cyclic Prefix-Orthogonal Frequency Divisional Multiplexing (CP-OFDM) scheme and a Discrete Fourier Transform-spreading-OFDM (DFT-s-OFDM) scheme for uplink transmission.

It is to be understood that both the foregoing general description and the following detailed description of the present invention are exemplary and explanatory and are intended to provide further explanation of the invention as claimed.

Technical Solution

In an aspect of the present disclosure for achieving the above-described object, provided is a method of transmitting an uplink signal by a user equipment in a wireless communication system, the method including: receiving, from a base station, information indicating one of a cyclic prefix-orthogonal frequency divisional multiplexing (CP-OFDM) scheme or a discrete Fourier transform-spreading-OFDM (DFT-s-OFDM) scheme; generating a waveform of an uplink signal according to the indicated scheme; and transmitting the generated waveform of the uplink signal to the base station. The user equipment may be allowed to modulate the uplink signal using a modulation scheme with a lowest modulation order only when the user equipment generates the waveform of the uplink signal according to the DFT-s-OFDM scheme.

In another aspect of the present disclosure for achieving the above-described object, provided is a user equipment for transmitting an uplink signal in a wireless communication system, the user equipment including: a receiver; a transmitter; and a processor that receives information indicating one of a cyclic prefix-orthogonal frequency divisional multiplexing (CP-OFDM) scheme or a discrete Fourier transform-spreading-OFDM (DFT-s-OFDM) scheme from a base station through the receiver, generates a waveform of an uplink signal according to the indicated scheme, and transmits the generated waveform of the uplink signal to the base station through the transmitter. The processor may be allowed to modulate the uplink signal using a modulation scheme with a lowest modulation order only when the processor generates the waveform of the uplink signal according to the DFT-s-OFDM scheme.

In still another aspect of the present disclosure for achieving the above-described object, provided is a method of receiving an uplink signal by a base station in a wireless communication system, the method including: transmitting, to a user equipment, information indicating one of a cyclic prefix-orthogonal frequency divisional multiplexing (CP-OFDM) scheme or a discrete Fourier transform-spreading-OFDM (DFT-s-OFDM) scheme; detecting a waveform of an uplink signal transmitted from the user equipment by assuming the indicated scheme; and demodulating the uplink signal based on the detected waveform of the uplink signal. The base station may be allowed to demodulate the uplink signal by assuming a modulation scheme with a lowest modulation order only when the base station indicates the DFT-s-OFDM scheme.

In a further aspect of the present disclosure, provided is a base station apparatus for performing the above-described uplink signal reception method.

The information indicating one of the CP-OFDM scheme or the DFT-s-OFDM scheme may be included in system information periodically broadcast by the base station.

The user equipment may transmit a random access preamble through a first message and receive a second message in response to the random access preamble, wherein the uplink signal may be a third message for contention resolution between user equipments, and the indicated scheme of the CP-OFDM or DFT-s-OFDM schemes may be applied from when the third message is transmitted after the reception of the second message.

When the waveform of the uplink signal is generated according to the CP-OFDM scheme, both distributed resource allocation and localized resource allocation may be supported for the uplink signal. When the waveform of the uplink signal is generated according to the DFT-s-OFDM scheme, only the localized resource allocation may be supported for the uplink signal.

The information indicating one of the CP-OFDM scheme or the DFT-s-OFDM scheme may be received via downlink control information corresponding to an uplink grant for the uplink signal, and the uplink signal may correspond to a physical uplink shared channel (PUSCH). One of the CP-OFDM scheme or the DFT-s-OFDM scheme may be implicitly indicated by at least one of Modulation and Coding Scheme (MCS) information, distributed/localized resource allocation information, and precoding information included in the downlink control information.

The information indicating one of the CP-OFDM scheme or the DFT-s-OFDM scheme may be determined based on power headroom of the user equipment.

Advantageous Effects

According to the present disclosure, information indicating which one of CP-OFDM and DFT-s-OFDM schemes a user equipment should use can be provided, thereby achieving switching between the CP-OFDM and DFT-s-OFDM schemes accurately and efficiently.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the present invention, and are incorporated in and constitute a part of this specification, illustrate embodiments of the invention and together with the description serve to explain the principles of the invention.

BEST MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present invention may be non-limited. Specific terminologies used in the following description are provided to help understand the present invention and the use of the terminologies can be modified to a different form within a scope of the technical idea of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
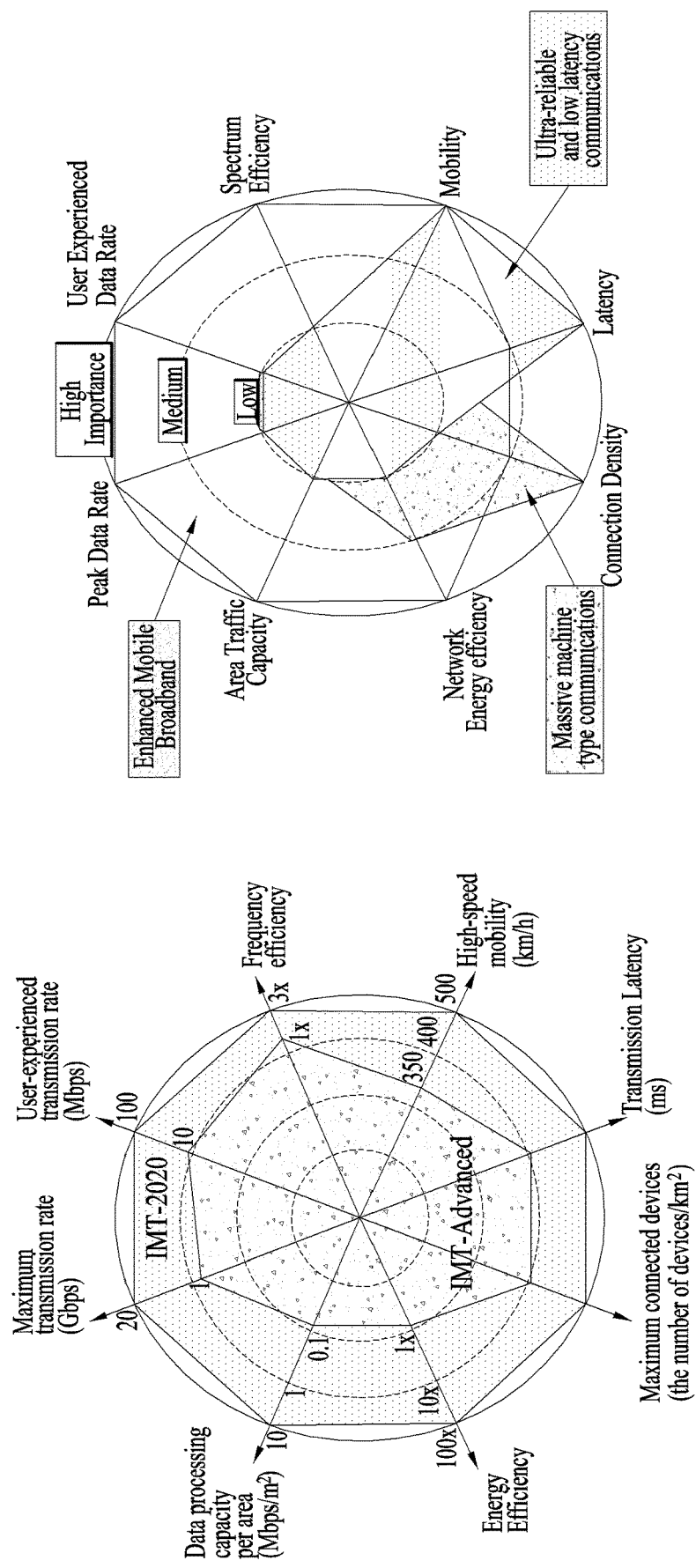
FIG. 1 illustrates a 5G service scenario and performance requirements thereof.
Figure 2:
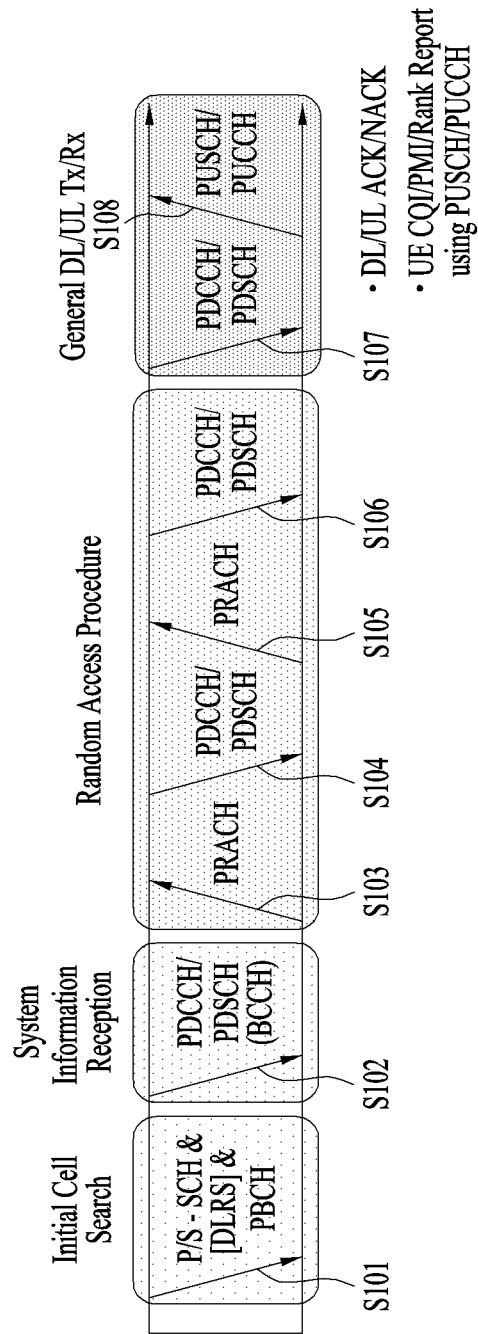
FIG. 2 illustrates physical channels used in the 3GPP LTE/LTE-A system and a general signal transmission method using the same.

FIG. 2 is a diagram for explaining an example of physical channels used for 3GPP LTE/LTE-A system and a general signal transmission method using the same.

Referring to FIG. 2, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB

[S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Hereinafter, a contention-based random access procedure in the LTE system will be described in detail.

(1) Message 1 transmission: A User Equipment (UE) may randomly select one random access preamble from a random access preamble set indicated by system information or a handover command. Thereafter, the UE may select Physical Random Access Channel (PRACH) resources and then transmit the random access preamble using the selected PRACH resources.

(2) Message 2 reception: After transmitting the random access preamble, the UE attempts to receive a random access response within a random access response reception window indicated through the system information or the handover command by an eNB. More specifically, the random access response may be transmitted in the form of a Medium Access Control Protocol Data Unit (MAC PDU), and the MAC PDU may be delivered over a Physical Downlink Shared Channel (PDSCH). To receive information on the PDSCH successfully, the UE needs to monitor a Physical Downlink Control Channel (PDCCH). That is, a PDCCH preferably includes information on a UE to receive the PDSCH, information on time and frequency radio resources of the PDSCH, and information on a transmission format of the PDSCH. Once the UE succeeds in receiving the PDCCH destined therefor, the UE may successfully receive the random access response over the PDSCH according to information included in the PDCCH. The random access response may include an identifier (ID) of the random access preamble (e.g., a Random Access Preamble ID (RAPID)), an Uplink (UL) grant indicating UL radio resources, a temporary Cell-Radio Network Temporary Identifier (C-RNTI), and a Timing Advance Command (TAC).

(3) Message 3 transmission: Upon receiving a valid random access response, the UE processes information included in the random access response. That is, the UE applies the TAC and stores the temporary C-RNTI. In addition, the UE may store data to be transmitted in response to the received valid random access response in a message 3 buffer. Meanwhile, the UE transmits data (i.e. message 3) to the eNB using the received UL grant. Message 3 should include an ID of the UE. This is because in the contention-based random access procedure, the eNB cannot identify which UE performs the random access procedure but the eNB should identify the UEs to avoid a collision later.

(4) Message 4 reception: After transmitting the data including its ID based on the UL grant included in the random access response, the UE awaits reception of a command for contention resolution from the eNB. That is, the UE attempts to receive a PDCCH to receive a specific message. If the UE receives the PDCCH using its C-RNTI, the UE terminates the random access procedure after determining that the random access procedure has been performed normally.

Figure 3:
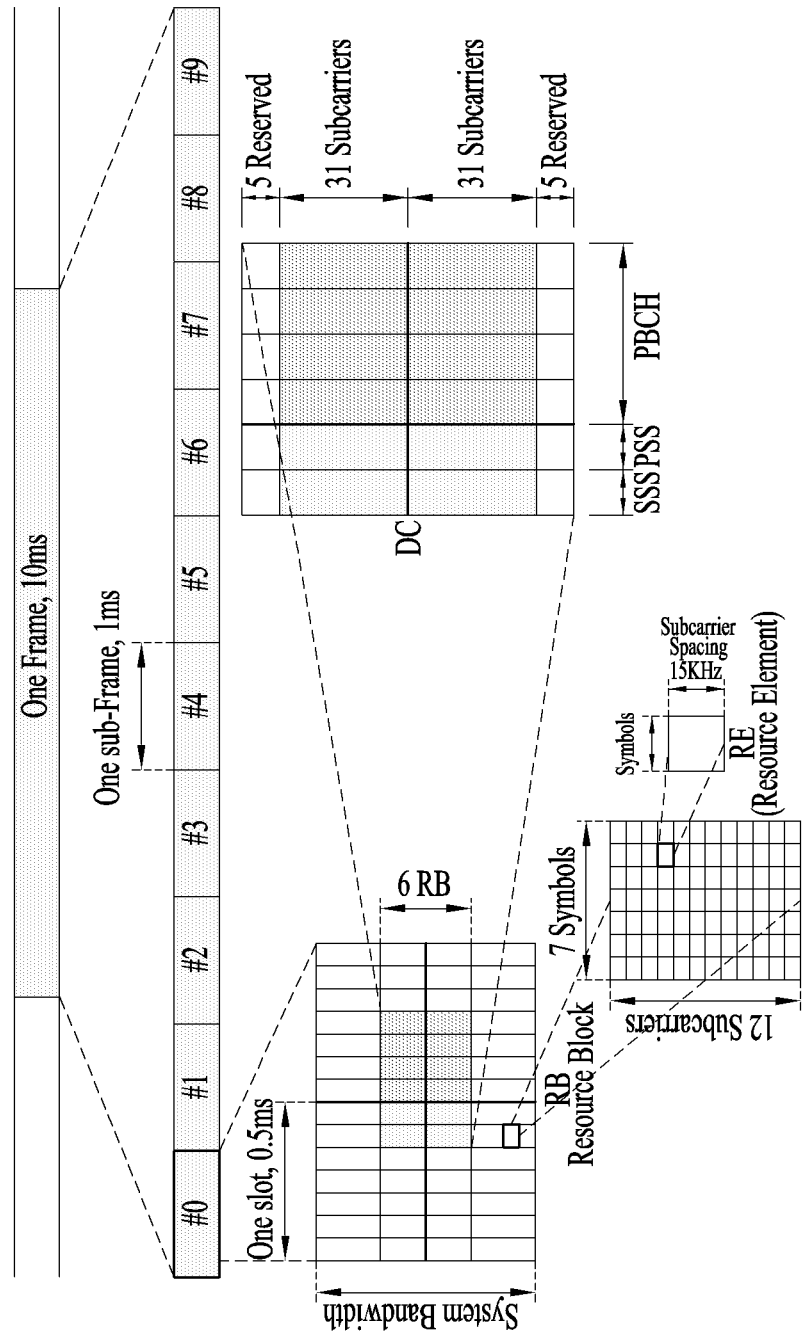
FIG. 3 illustrates the structure of a radio frame of the 3GPP LTE/LTE-A system.

FIG. 3 is a diagram for explaining an example of a structure of a radio frame. Referring to FIG. 3, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

A frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference. When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel). That is, when normal CP is used, 1 RB is defined as 12 subcarriers with 15 kHz subcarrier spacing and 7 OFDM symbols.

6 RBs at the center frequency are used to transmit a Primary Synchronization Signal (PSS) and a Secondary Synchronization Signal (SSS), which are used to establish synchronization, and a Physical Broadcast Channel (PBCH)

for system information transmission. The above-described frame structure, signals, and channel locations may vary depending on a normal/extended CP, TDD/FDD, etc.

Figure 4:
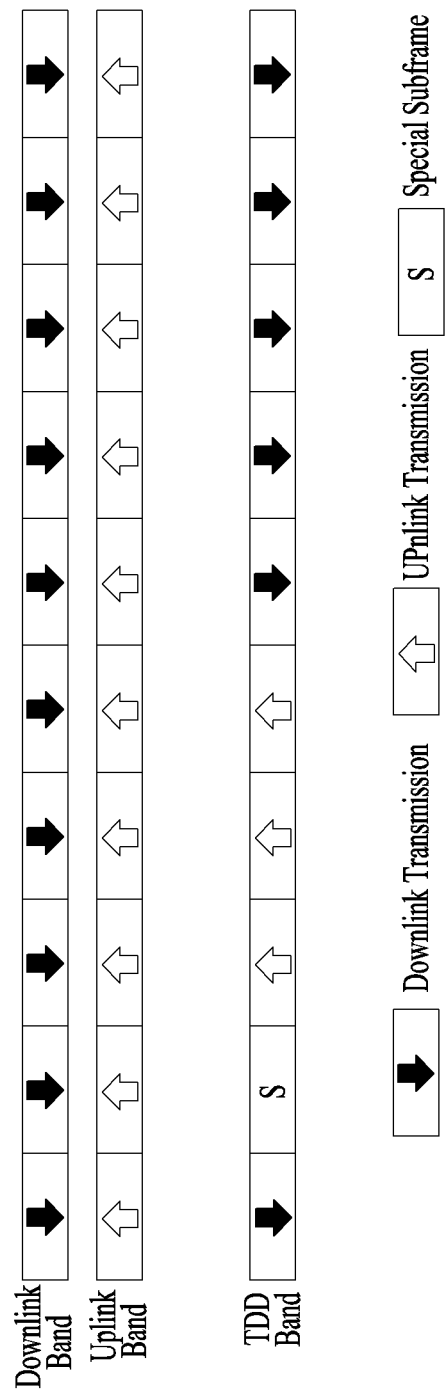
FIG. 4 illustrates Frequency Division Duplex (FDD) and Time Division Duplex (TDD) schemes of the 3GPP LTE/LTE-A system.

FIG. 4 illustrates FDD and TDD in the LTE/LTE-A system. Referring to FIG. 4, in the FDD, different frequency bands are used for DL and UL transmission, respectively. On the other hand, in the TDD, DL and UL regions are separated from each other on a subframe basis in the same frequency band.

Hereinafter, UL multiple access schemes of the LTE system will be described.

First, an SC-FDMA transmission scheme is explained. SC-FDMA may be referred to as Discrete Fourier Transform-spreading-Orthogonal Frequency Divisional Multiple Access (DFT-s-OFDMA). The SC-FDMA is an efficient transmission scheme capable of maintaining Peak-to-Average Power Ratio (PAPR) or a Cube Metric (CM) value at a low level and avoiding a non-linear distortion part of a power amplifier. The PAPR is a parameter representing waveform properties and obtained by dividing the peak value of waveform amplitude by a time-averaged root mean square (RMS) value. The CM is another measurement value representing the PAPR value. The PAPR is associated with a dynamic range which should be supported by a power amplifier at a transmitter. That is, to support transmission with a high PAPR value, the dynamic range (or a linear part) of the power amplifier needs to increase. Since the cost of the power amplifier increases as the dynamic range of the power amplifier increases, a transmission scheme capable of maintaining a low PAPR value is suitable for UL transmission. Accordingly, the current 3GPP LTE system has used the SC-FDMA capable of maintaining low PAPR as a UL transmission scheme.

Figure 5:
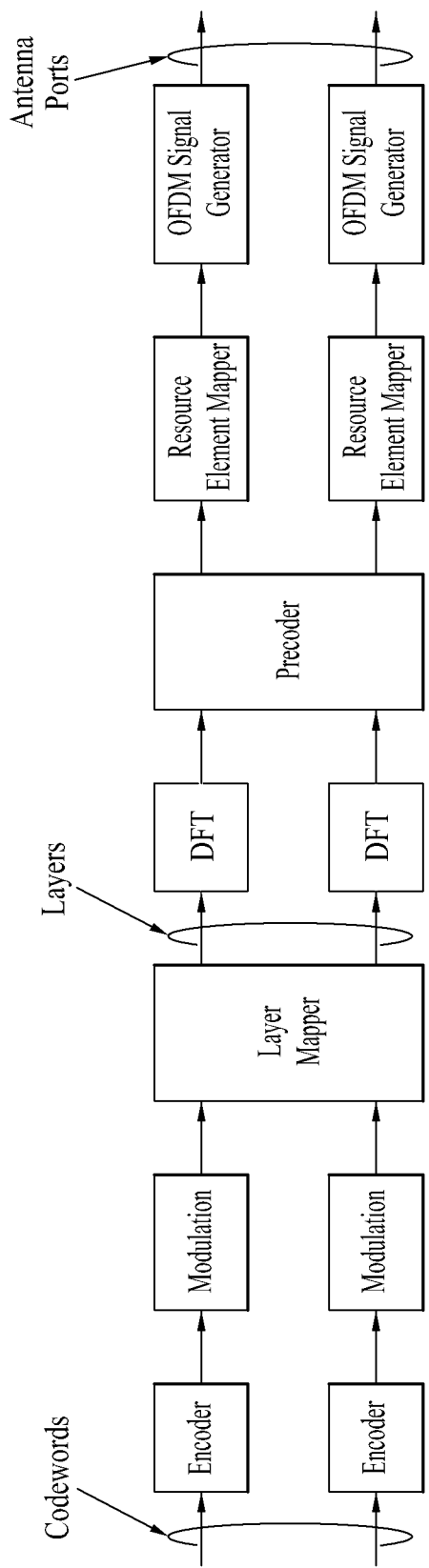
FIG. 5 illustrates an uplink data transmission procedure of the 3GPP LTE/LTE-A system.

FIG. 5 is a block diagram for explaining a DFT-s-OFDMA (or SC-FDMA) scheme for LTE uplink.

One or more codewords encoded by an encoder can be scrambled using a UE-specific scrambling signal. The scrambled codewords are modulated to complex symbols using a BPSK, QPSK, 16 QAM or 64 QAM scheme depending on the type of a transmitted signal and/or a channel state. Thereafter, the modulated complex symbols are mapped to one or more layers.

Although one codeword may be mapped to one layer on a symbol basis, one codeword can be distributedly mapped to up to four layers. If one codeword is distributedly mapped to a plurality of layers, symbols included in each codeword may be sequentially mapped to the layers and then transmitted. In a single-codeword transmission configuration, only one encoder and one modulation block are used.

In addition, transform precoding can be applied to layer-mapped signals. Specifically, Discrete Fourier Transform (DFT) based precoding may be applied to the layer-mapped signals. The layer-mapped signals are multiplied by a pre-determined precoding matrix selected based on the channel state and then allocated to transmission antennas. Thereafter, the per-antenna transmitted signals are mapped to time-frequency resource elements to be used for transmission and then transmitted via the individual antennas after passing through an OFDM signal generator.

New RAT

To satisfy the low-latency requirement among new RAT performance requirements, a new subframe needs to be designed.

[Self-Contained Subframe]

Figure 6:
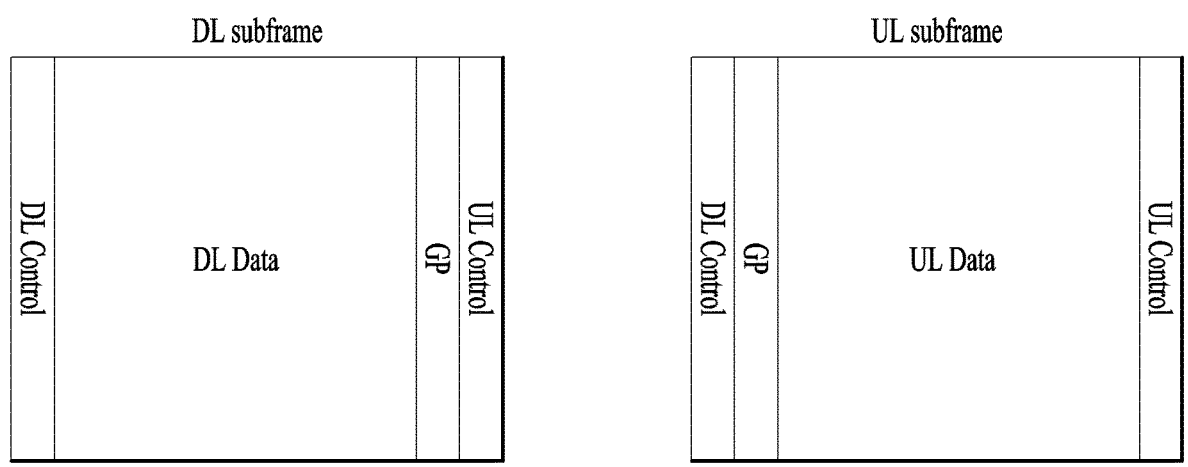
FIG. 6 illustrates the structure of a self-contained subframe according to an embodiment of the present disclosure.

FIG. 6 illustrates a self-contained subframe proposed for the new RAT system. In the following description, the self-contained subframe can be referred to as a subframe for simplicity.

According to a TDD-based self-contained subframe structure, both a resource region for DL and a resource region for UL (e.g., DL and UL control channels) exist in one subframe.

Although FIG. 6 shows the structure of the self-contained subframe where the subframe is composed in the following order: DL control region—data region—UL control region, the present disclosure is not limited thereto. For example, as another self-contained subframe structure, a subframe may be composed in the following order: DL control region—UL control region—data region.

The self-contained subframe can be classified as either a DL self-contained subframe or a UL self-contained subframe depending on the direction of data transmission in the corresponding subframe.

This self-contained subframe structure requires a time gap that allows an eNB and a UE to switch a transmission mode to a reception mode and vice versa. To this end, at least one OFDM symbol on which DL-to-UL switching is performed is set as a guard period (GP) in the self-contained subframe structure. The GP is located at the time when the DL-to-UL switching is performed. For example, in a DL subframe, the GP is located between a DL data region and a UL control region, and in a UL subframe, the GP is located between a DL control region and a UL data region.

Meanwhile, one subframe can be defined to have constant time duration. For example, in the New RAT (NR) system, the time duration of one subframe may be fixed to 1 ms. In this case, since the duration of one symbol is determined by subcarrier spacing, the number of symbols included in one subframe may also be determined by the subcarrier spacing. For example, if subcarrier spacing is 15 kHz, 14 symbols may be included in one subframe. However, if the subcarrier spacing doubles, that is, increases to 30 kHz, the duration of one symbol decreases by half. Thus, a total of 28 symbols may be included in one subframe. Generally, subcarrier spacing of 15 kHz*$2^n$ can be used, and thus a total of 14*$2^n$ symbols can be included in one subframe, where n is an integer such as 0, 1, 2, . . . , but n may not be necessarily a positive integer. For instance, if n is a negative integer, −1, a total of 7 symbols are included in one subframe.

[DFT-s-OFDM & CP-OFDM for NR Uplink]

According to the legacy LTE system, Cyclic Prefix (CP)-OFDM and DFT-s-OFDM schemes have been used for DL and UL, respectively. For simplicity, CP-OFDM and DFT-s-OFDM can be referred to as OFDM and SC-FDMA, respectively.

Although the DFT-s-OFDM can be regarded as kind of OFDM, the DFT-s-OFDM and the CP-OFDM differ in that a process for reducing PAPR through DFT is further performed in the DFT-s-OFDM before an OFDM signal is generated through IFFT.

According to an embodiment of the present disclosure, both of the DFT-s-OFDM and CP-OFDM can be supported for NR UL. Before explaining the NR UL, the advantages and disadvantages of the DFT-s-OFDM and CP-OFDM will be described.

Figure 7:
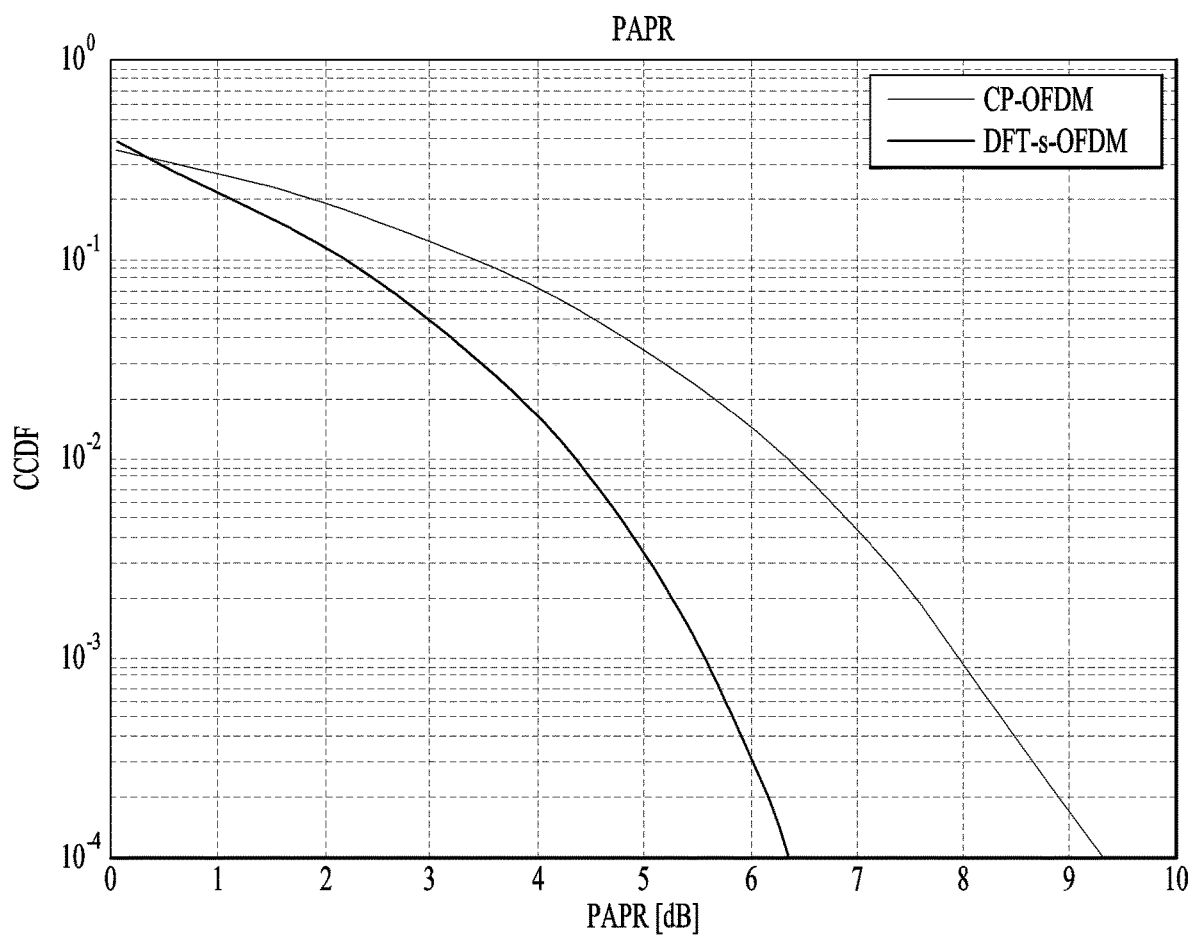
FIGS. 7 to 13 illustrate performance simulation results of CP-OFDM and DFT-s-OFDM under various conditions

FIG. 7 illustrates a PAPR performance comparison between CP-OFDM and DFT-s-OFDM.

Referring to FIG. 7, it can be seen that the DTF-s-OFDM shows better PAPR performance than the CP-OFDM by about 2 dB and 2.5 dB at the 1 PAPR level and 0.1% PAPR level, respectively.

To satisfy an Adjacent Channel Leakage Ratio (ACLR) requirement (i.e., 30 dBc), input powers of −3.75 dBm and −1.75 dBm are assumed for the CP-OFDM and DFT-s-OFDM, respectively.

Next, Block Error Rates (BLERs) of the CP-OFDM and DFT-s-OFDM will be described regarding ideal and realistic Channel Estimation (CE) in SISO, 2x1-SIMO, and 4x1-SIMO.

Figure 8:
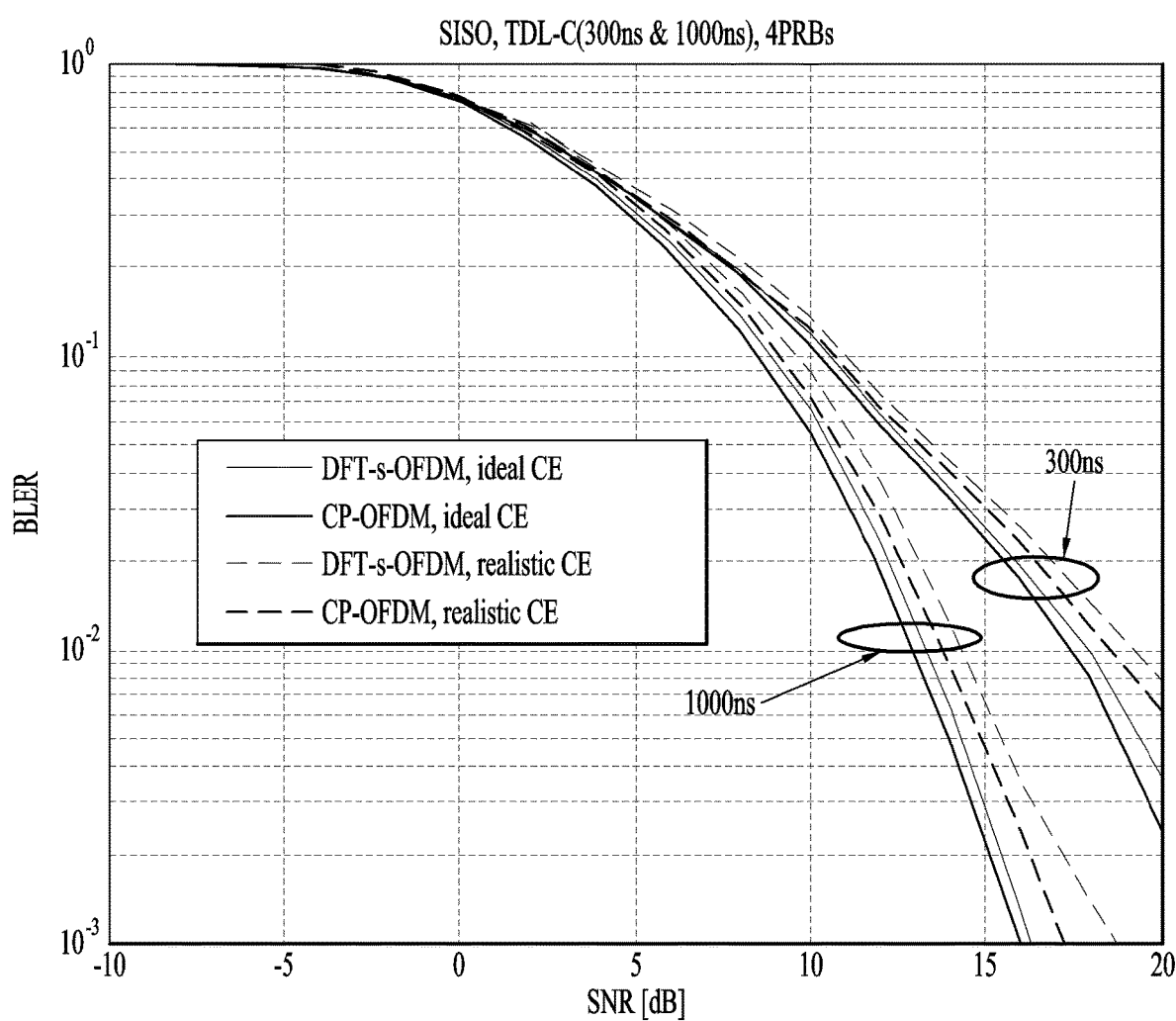
Figure 9:
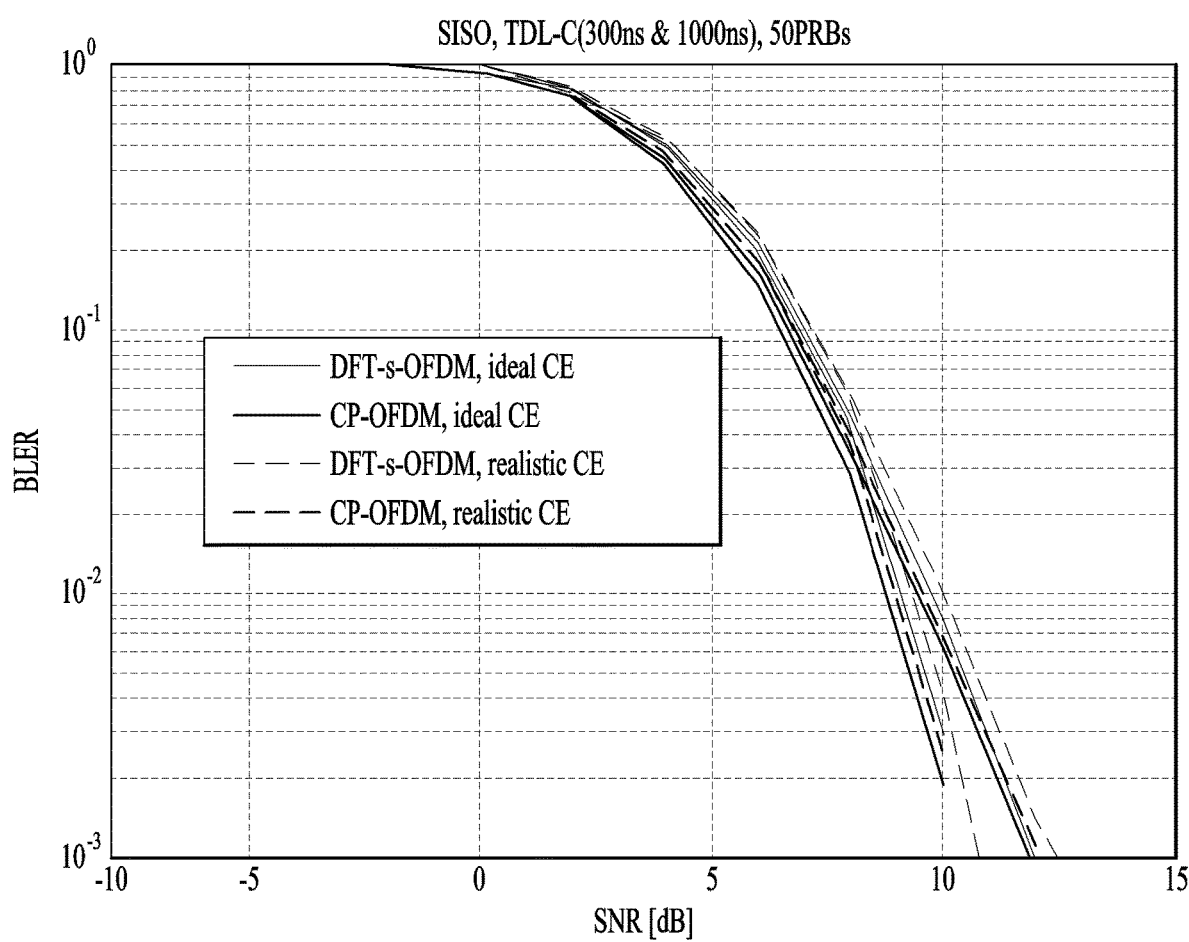

FIG. 8 shows the BLERs of the CP-OFDM and DFT-s-OFDM in 4-PRB SISO transmission, and FIG. 9 shows the BLERs of the CP-OFDM and DFT-s-OFDM in 50-PRB SISO transmission. Assuming that the same power amplifier model is applied, a performance gap between the CP-OFDM and DFT-s-OFDM at BLER 0.1 is within 0.5 dB.

Figure 10:
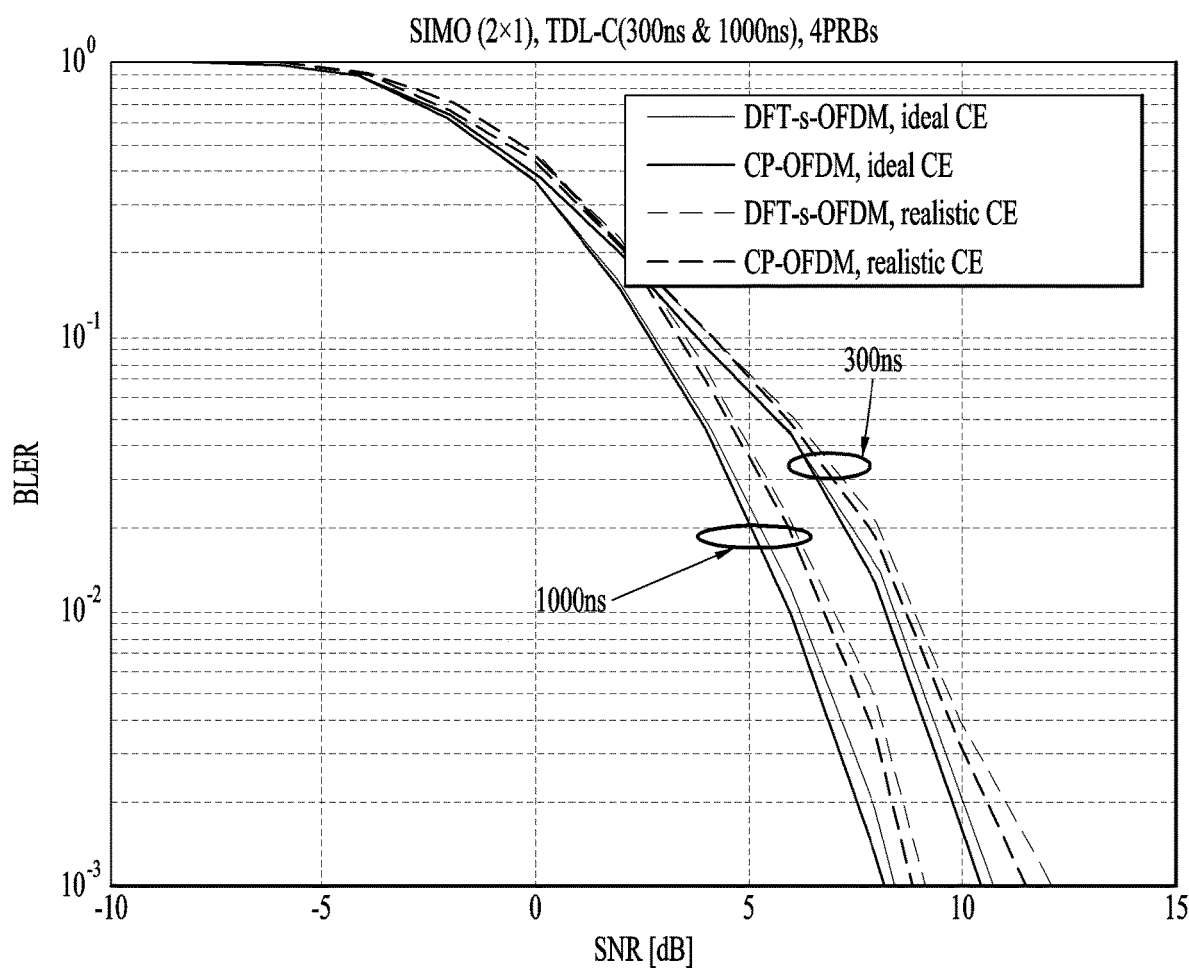
Figure 11:
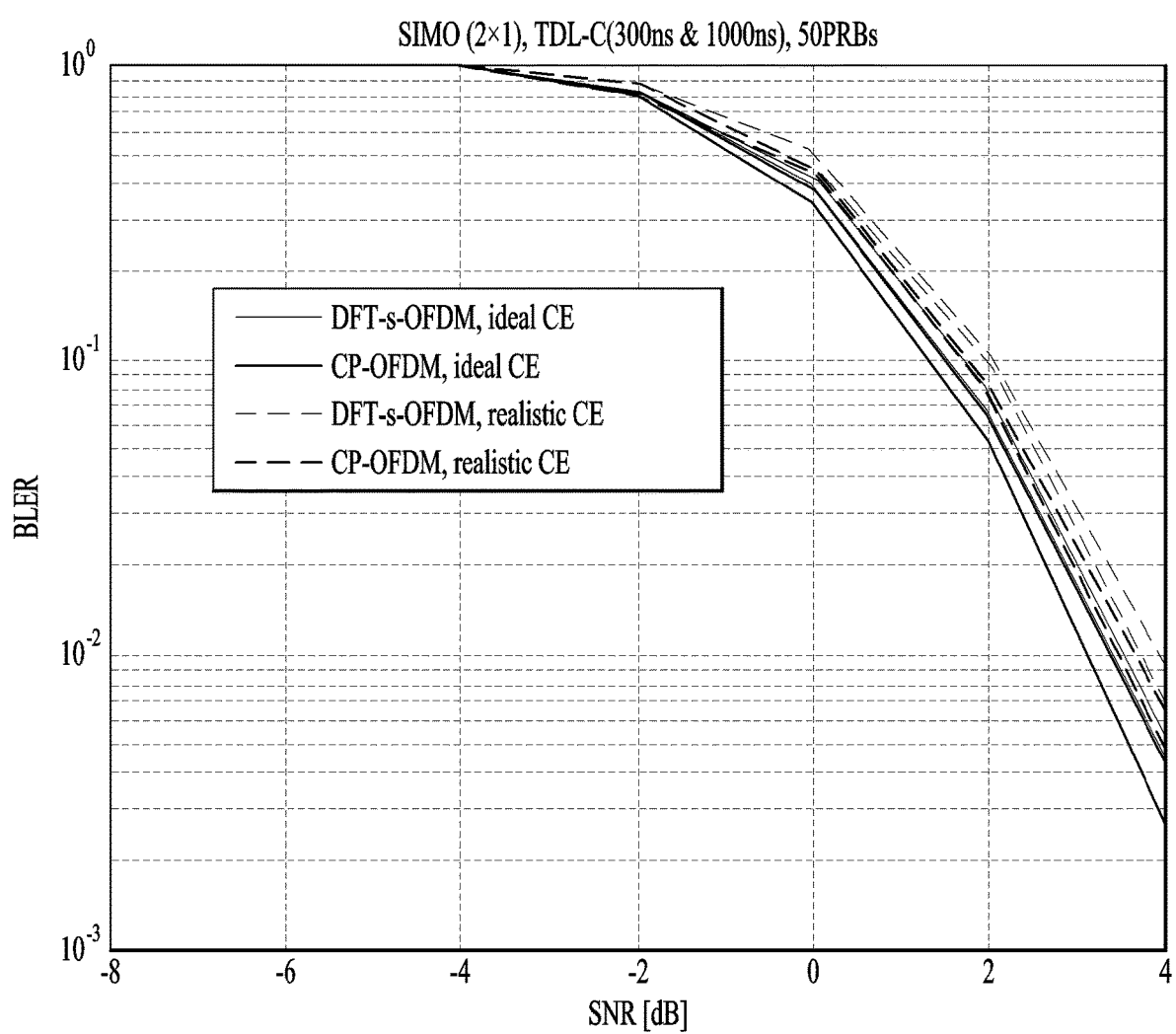

FIG. 10 shows the BLERs of the CP-OFDM and DFT-s-OFDM in a 4-PRB SIMO 2Rx-1Tx case, and FIG. 11 shows the BLERs of the CP-OFDM and DFT-s-OFDM in a 50-PRB SIMO 2Rx-1Tx case. Assuming that the same power amplifier model is applied, a performance gap between the CP-OFDM and DFT-s-OFDM at BLER 0.1 is within 0.3 dB.

Figure 12:
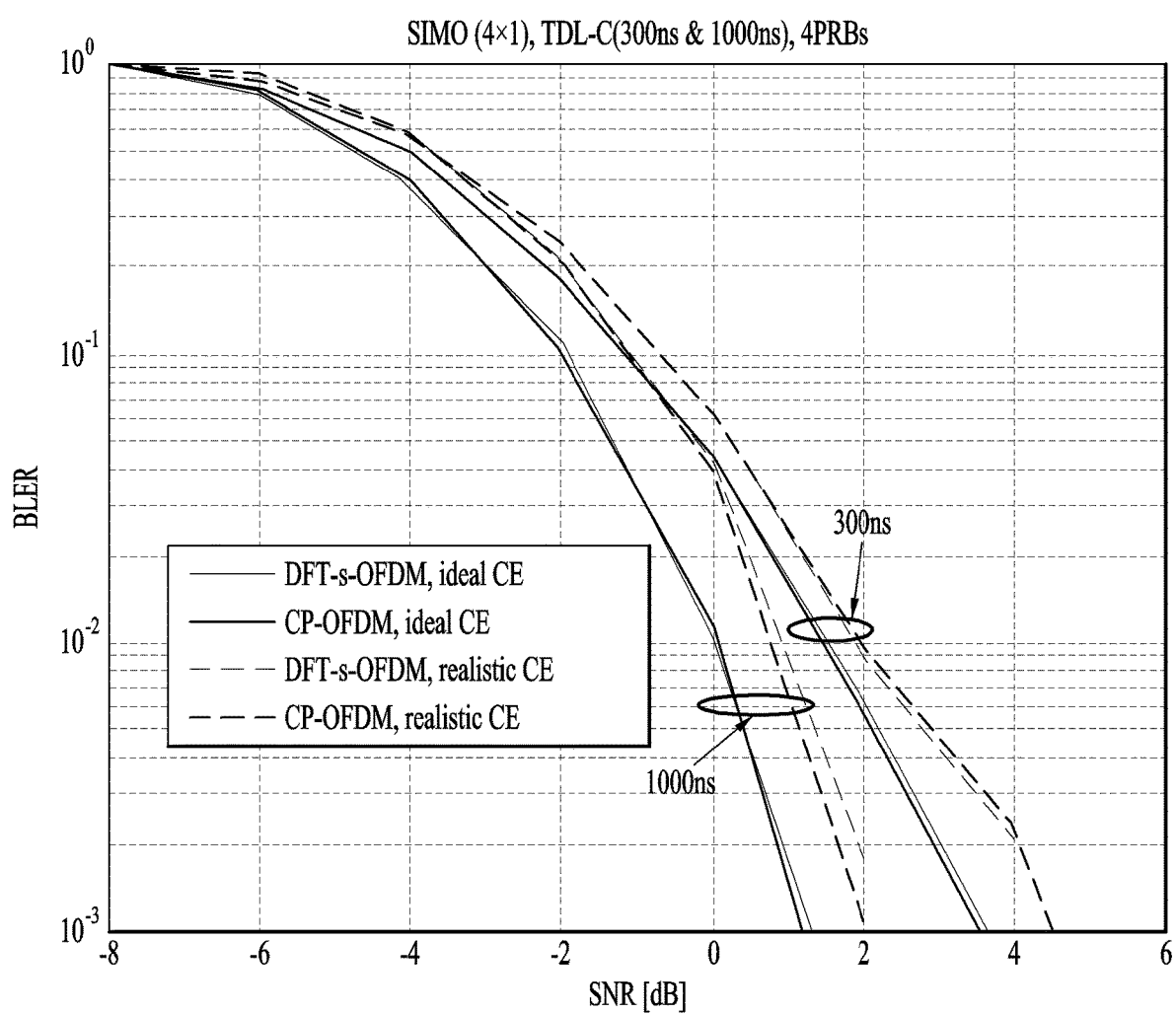
Figure 13:
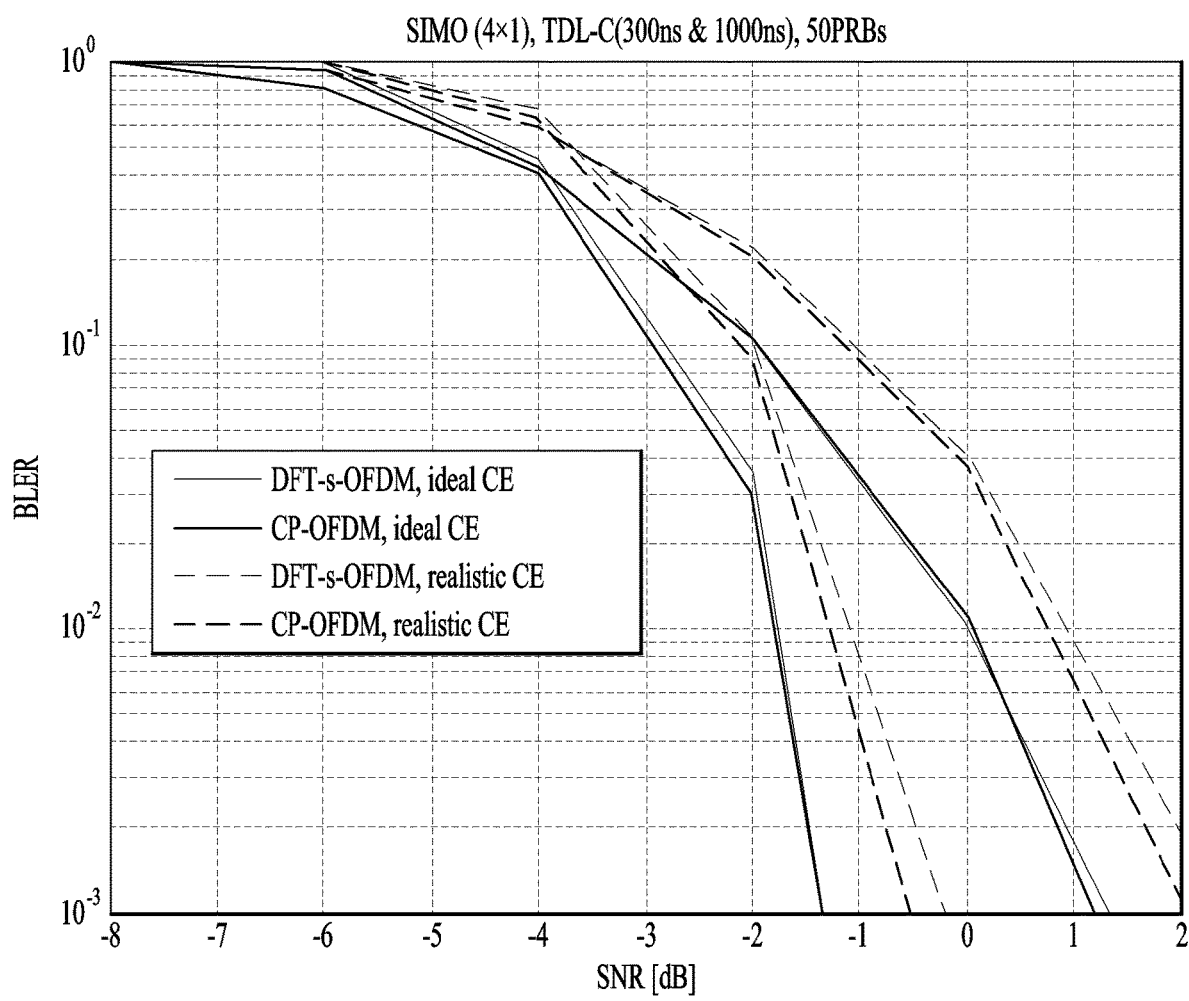

FIG. 12 shows the BLERs of the CP-OFDM and DFT-s-OFDM in a 4-PRB SIMO 4Rx-1Tx case, and FIG. 13 shows the BLERs of the CP-OFDM and DFT-s-OFDM in a 50-PRB SIMO 4Rx-1Tx case. Assuming that the same power amplifier model is applied, a performance gap between the CP-OFDM and DFT-s-OFDM at BLER 0.1 is within 0.1 dB.

The simulation results of FIGS. 8 to 13 show that the CP-OFDM has a high gain of about 0.1 to 0.5 dB in all cases than the DFT-s-OFDM. As the number of reception antennas increases, the performance degradation of the DFT-s-OFDM approaches zero.

From the above results, it can be seen that if the same power amplifier model is assumed, the DFT-s-OFDM offers a higher coverage gain that the CP-OFDM by about 1.5 to 2 dB at low spectrum efficiency.

Generally, the CP-OFDM shows better performance than the DFT-s-OFDM in some respects. For example, the CP-OFDM has flexible resource allocation and low receiver complexity compared to the DFT-s-OFDM. In particular, the CP-OFDM shows excellent demodulation performance for a high MCS compared to the DFT-s-OFDM. Therefore, a CP-OFDM-based waveform is desirable to achieve high spectrum efficiency.

Meanwhile, since power amplifier efficiency is expected to increase as PAPR decreases, low PAPR characteristics are an important factor to be considered in generating a waveform. Since the DFT-s-OFDM has lower PAPR than the CP-OFDM, the DFT-s-OFDM is better than the CP-OFDM when power is limited. In other words, when power is limited and a UE uses a low MCS, the DFT-s-OFDM may provide a gain in terms of link performance. In summary, when power is limited, the DFT-s-OFDM is more suitable than the CP-OFDM.

Application of coverage proposed for an eMBB scenario of the NR system is currently discussed, and to this end, a low-PAPR scheme is required. For the low-PAPR scheme, a hybrid scheme where the DFT-s-OFDM and CP-OFDM coexist can be used.

Hereinafter, a description will be given of how the hybrid scheme where the DFT-s-OFDM with low PAPR characteristics and the CP-OFDM with high spectral efficiency coexist is applied to NR uplink.

However, the present disclosure is not limited to the hybrid scheme. Depending on how the DFT-s-OFDM and CP-OFDM are configured, not only the hybrid scheme but also a non-hybrid scheme can be considered. In the following description, a signal waveform generated based on the DFT-s-OFDM is referred to as 'DFT-s-OFDM waveform', and a signal waveform generated based on the CP-OFDM is referred to as 'CP-OFDM Waveform'.

Meanwhile, a Base Station (BS) should be able to know which waveform a UE uses in order to correctly receive a DFT-s-OFDM waveform or a CP-OFDM waveform from the UE.

Method of Configuring Non-Hybrid or Hybrid Depending on Service

According to an embodiment of the present disclosure, either or both a DFT-s-OFDM waveform or a CP-OFDM waveform can be supported on one carrier. To this end, a new field for indicating the supported waveform can be defined in information (e.g., system information) transmitted by a base station (BS) to a user equipment (UE). For example, a 2-bit field may be defined in system information. If the field value is set to 1, it may mean that only the DFT-s-OFDM waveform is supported as a non-hybrid. If the field value is set to 2, it may mean that only the CP-OFDM waveform is supported as a non-hybrid. If the field value is set to 3, it may mean that both of the DFT-s-OFDM and CP-OFDM waveforms are supported as a hybrid.

Although the 2-bit field is assumed for convenience of description, the present disclosure is not limited thereto. For example, if a 1-bit field in the system information is used to indicate the waveform, the bit values of 0 and 1 may indicate the DFT-s-OFDM waveform and CP-OFDM waveform, respectively.

The waveform indication field can be configured according to service types.

For example, in the case of a service that requires wide coverage such as an mMTC service, UE's power amplifier efficiency is important. Thus, the BS may set the waveform indication field to 1 in order to use the DFT-s-OFDM waveform with good PAPR characteristics so that all UEs may perform UL transmission on a corresponding carrier using the DFT-s-OFDM waveform.

On the other hand, in the case of a service that requires high throughput such as an eMBB service, it is desirable to use a high MCS, and to this end, the waveform indication field is preferably set for the CP-OFDM waveform. Therefore, all UEs may perform UL transmission using the CP-OFDM waveform.

However, in the case of a service that requires wide coverage even though it corresponds to an eMBB service, the BS may set the waveform indication field to 3 to simultaneously support the DFT-s-OFDM and CP-OFDM waveforms. For example, the BS may allow a near UE to use the DFT-s-OFDM waveform and a far UE located at a cell boundary to use the CP-OFDM waveform so that the data transmission rate and coverage requirements can be simultaneously satisfied. To this end, the BS needs to inform the UEs whether the DFT-s-OFDM waveform or CP-OFDM waveform is used.

For example, the waveform indication field can be explicitly delivered to the UEs through the system information transmitted by the BS. Specifically, if the waveform indication field is included in the system information, for example, a PBCH (e.g., MIB information), a UE may recognize the waveform for uplink transmission by obtaining the system information during an initial access procedure. If the waveform indication field is set for the DFT-s-OFDM waveform, the UE may perform initial data transmission using the DFT-s-OFDM waveform. For instance, during a random access procedure, the UE transmits an RACH preamble and receives message 2 from the BS. Thereafter, the UE uses the DFT-s-OFDM waveform to transmit message 3. If an RACH is defined in the form of data rather than a preamble, the UE may use the DFT-s-OFDM waveform when transmitting the RACH. In addition, uplink control information (e.g., PUCCH) may also be transmitted using the DFT-s-OFDM waveform.

Of course, the waveform indication field in the system information can be set for the CP-OFDM waveform.

The BS may update the waveform indication field in the system information. For example, the BS may use a carrier for eMBB short coverage first and use the carrier for eMBB extended coverage later. In this case, the BS may update the waveform indication field in the system information. After obtaining the updated system information, UEs may perform uplink transmission by applying the changed waveform after N subframes. For example, if the DFT-s-OFDM waveform has been changed to the CP-OFDM waveform, a UE may transmit an uplink signal using the CP-OFDM waveform after N subframes from a subframe in which the system information indicating the waveform change is received.

Method of Configuring Hybrid Waveform

In contrast to the non-hybrid scheme, the hybrid scheme means that the DFT-s-OFDM waveform and CP-OFDM waveform can be simultaneously transmitted on one carrier. For example, according to the hybrid scheme, UE 1 may transmit the DFT-s-OFDM waveform and UE 2 may transmit the CP-OFDM wave form in one subframe. Since reception methods for the two waveforms are different from each other, a UE should be able to know which waveform the UE should use and a BS should be able to know which waveform the UE uses for uplink transmission. Hereinafter, a waveform indication method between a UE and a BS for switching from the DFT-s-OFDM waveform to CP-OFDM waveform and vice versa will be described. Here, waveform indication may be performed by a BS, but it may also be performed by a UE.

(1) Explicit Waveform Indication (1-i) Indication Via DCI

For example, after selecting a waveform, a BS can explicitly inform a UE of the selected waveform via Downlink Control Information (DCI). To this end, a new field for indicating the waveform may be defined in the DCI. The BS may transmit the waveform indication field together with various fields (e.g., MCS, RV, etc.) included in the DCI corresponding to a UL grant.

Meanwhile, a criterion can be defined to allow a BS to select either the DFT-s-OFDM waveform or CP-OFDM waveform. Specifically, the BS may determine each UE's waveform by measuring UL power. For example, the BS measures received power of a reference signal (e.g., SRS) transmitted from a UE. If the measured power is sufficient to support a high MCS (e.g., an MCS with a high modulation order) as in the case of an inner-cell UE, the BS may instruct the UE to use the CP-OFDM waveform showing high performance at a high MCS. On the contrary, if the measured power is insufficient to support a high MCS as in the case of a cell-edge UE, the BS may instruct the UE to use the DFT-s-OFDM waveform capable of increasing power based on low PAPR characteristics.

In MIMO, since multiple streams are transmitted, a different waveform may be configured per codeword or stream. For example, assume that a UE transmits two codewords, and a high MCS is applied to one codeword and a low MCS is applied to the other codeword. In this case, the UE may transmit each of the codewords using the DFT-s-OFDM waveform or CP-OFDM waveform.

(1-ii) UE's Waveform Request Based on Power Headroom (PH)

A UE can calculate a PH value based on its current maximum power value and a currently used power value. Based on the PH, the UE can provide a BS with information which is a basis for the BS selecting the DFT-s-OFDM waveform or CP-OFDM waveform.

For example, if the PH value is smaller than a threshold, the UE may request the BS to switch the current waveform. If the PH value, which was greater than the threshold, becomes smaller than the threshold, the UE may report it to the BS and the BS may configure the DFT-s-OFDM waveform for the UE through DCI. On the contrary, if the PH value, which was smaller than the threshold, becomes greater than the threshold, the UE may report it to the BS and the BS may configure the CP-OFDM waveform for the UE through DCI.

Here, the threshold may be transmitted through system information, higher signaling (e.g., RRC signaling), or a physical layer signal. In addition, the information reported by the UE to the BS when the PH value becomes smaller or greater than the threshold may be transmitted through higher signaling (e.g., RRC signaling) or a physical layer signal.

Meanwhile, if the BS indicates a waveform whenever transmitting DCI, it may be advantageous in terms of flexibility but increase signaling overhead. According to another embodiment of the present disclosure, reporting, by the UE, that the PH value related to waveforms is changed may mean that the UE notifies the BS of a waveform selected by the UE. For example, when the UE notifies waveform selection, the BS may transmit ACK in response thereto. By doing so, the waveform may be configured/changed.

For example, the UE may notify the waveform selection through RRC signaling and receive ACK information from the BS through RRC signaling. After receiving the ACK, the UE may perform UL transmission using a waveform notified by the UE.

Such a waveform notification method is not limited to RRC signaling. That is, the UE may notify a waveform through a physical layer signal (e.g., PUCCH) and receive ACK through a physical layer signal.

Meanwhile, if the UE receives NACK from the BS, the UE maintains the current waveform.

(2) Implicit Waveform Indication (2-i) Mapping between MCS Level in DCI and Waveform A BS can determine which one of the DFT-s-OFDM waveform and CP-OFDM waveform is better in terms of performance based on a result of measuring power of a UL Sounding Reference Signal (SRS) received from a UE. According to an embodiment of the present disclosure, MCS level information included in DCI can be tied to a waveform instead of additionally defining explicit bits for indicating the waveform in the DCI. Therefore, the waveform can be determined by the BS designating an MCS level. Alternatively, MCS levels and waveforms may be joint-encoded and then mapped to an MCS field in the DCI.

For example, it may be predetermined that the DFT-s-OFDM waveform showing good performance at a low MCS is used for MCSs 1 to 4 and the CP-OFDM waveform showing good performance at a high MCS is used for MCSs 5 to 16. Based on the predetermined relationship between the MCS levels and waveforms, a waveform may be implicitly signaled even if the BS indicates just an MCS level. For example, when MCS 2 is indicated via DCI, the UE may transmit the DFT-s-OFDM waveform using modulation and coding rates corresponding to MCS 2.

(2-ii) Waveform Determination Based on Power Headroom Report (PHR)

A BS can control transmission power of a UE using a closed loop power control (CLPC) method. In addition, the BS can adjust power per channel (e.g., PUCCH, PUSCH, etc.) through a TPC command. Moreover, the BS can check available power of the UE by requesting the UE to send a PHR.

According to an embodiment of the present disclosure, a waveform between a BS and a UE can be predefined based on a PH value.

For example, it is assumed that UE's maximum output power available for the CP-OFDM waveform is 23 dBm and UE's maximum output power available for the DFT-s-OFDM waveform with low PAPR characteristics is 25 dBm. If current transmission power of data or control information, which is configured through a TPC command, is 19 dBm, power of 4 dB is remained in the case of the DFT-s-OFDM waveform. In this case, it may be expected that high transmission power is required because a BS and a UE are located far away from each. Accordingly, the UE should use a low MCS for transmission, and the DFT-s-OFDM waveform may show better performance than the CP-OFDM waveform.

For example, if a difference between the maximum transmission power (PMax) and current transmission power is greater than a threshold, the CP-OFDM waveform may be used. On the contrary, if the difference therebetween is smaller than the threshold, the DFT-s-OFDM waveform may be used. Either the DFT-s-OFDM waveform or CP-OFDM waveform may be a criterion for the value of PMax. The PMax value may vary depending on a UE class. In addition, the threshold may be configured for each channel.

If the BS requests the PHR, the UE calculates a PH value and then transmits the PHR using the currently configured waveform. Upon receiving ACK from the BS in response to the PHR, the UE may determine whether to use either the DFT-s-OFDM waveform or CP-OFDM waveform based on the threshold. For example, if the PH value becomes smaller than the threshold while the UE uses the CP-OFDM waveform, the UE changes the configured waveform to the DFT-s-OFDM waveform. On the contrary, if the PH value becomes greater than the threshold while the UE uses the DFT-s-OFDM waveform, the UE changes the configured waveform to the CP-OFDM waveform.

The threshold may be transmitted via system information, higher layer signaling, or a physical layer signal. In addition, the threshold may be configured cell-specifically or UE-specifically.

(2-iii) Mapping Between UE Class and Waveform

Power amplifier efficiency is significantly related to UE performance. For example, when a UE uses a power amplifier with high performance, it may be desirable to use the CP-OFDM waveform. On the other hand, when a UE uses a low-cost Power Amplifier (PA) and there is no enough space in PH, it may be desirable to switch to the DFT-s-OFDM waveform.

Thus, UE classes may be tied to waveforms. For example, if a UE has good performance, a BS may configure the UE to use only the CP-OFDM waveform. On the contrary, if a UE has poor performance, the BS may configure the UE to use only the DFT-s-OFDM waveform. In addition, the BS may allow a UE to operate in the hybrid scheme where the DFT-s-OFDM and CP-OFDM coexist depending on UE performance.

(2-iv) Mapping Between Resource Allocation and Waveform

For the CP-OFDM waveform, both continuous resource (e.g., RB) allocation and non-continuous resource allocation can be used. Thus, a BS may determine a resource allocation method depending on channel states. On the other hand, for the DFT-s-OFDM waveform, the continuous resource allocation is needed to maintain low PAPR characteristics, and thus there may be a restriction on scheduling.

According to an embodiment of the present disclosure, a waveform can be implicitly indicated through a resource allocation method. For example, if RBs are allocated in a localized manner, a UE may perform transmission using the DFT-s-OFDM waveform. On the contrary, if RBs are allocated in a distributed manner, a UE may use the CP-OFDM waveform. In this case, the RB allocation may be indicated via DCI corresponding to a UL grant.

In addition, the UE may select either the DFT-s-OFDM waveform or CP-OFDM waveform by simultaneously considering the amount of allocated resources and the resource allocation method. A UE considering low PAPR characteristics is likely to be located at a cell edge, and thus the UE may be allocated a narrow band from the BS. In this case, if resources are allocated in a localized manner and the amount of allocated resources is smaller than a threshold (RB_th), the UE may use the DFT-s-OFDM waveform. Here, the threshold (RB_th) may be provided through UE-specific signaling or higher-layer signaling. Further, the threshold (RB_th) may mean the size of an allocated frequency band, i.e., the number of RBs.

For example, it is assumed that the threshold (RB_th) is 4. In this case, if localized RB allocation is indicated by DCI corresponding to a UL grant and a total of 4 RBs are allocated, a UE may perform transmission using the DFT-s-OFDM waveform. On the other hand, if the number of allocated RBs is greater than 5 even though the RBs are allocated in a localized manner, the UE may perform transmission using the CP-OFDM waveform.

(2-v) Mapping Between Precoding Information and Waveform

To maintain the low PAPR characteristics of the DFT-s-OFDM waveform, a precoding matrix for DFT-s-OFDM waveform may be configured differently from that of the CP-OFDM waveform. According to an embodiment of the present disclosure, Precoding Matrix Indices (PMIs) of a codebook can be mapped to waveforms.

For example, assuming that PMI 1 is a precoding matrix for selecting an antenna capable of maintaining the low PAPR characteristics, it is desirable that PMI 1 is mapped to the DFT-s-OFDM waveform. That is, a PMI for maintaining the characteristics of the DFT-s-OFDM waveform may be tied to the corresponding waveform.

The mapping relationship between the PMIs and waveforms may be preconfigured/predefined between a BS and a UE. Alternatively, the BS may inform the UE of the mapping between the PMIs and waveforms though a physical layer signal or higher layer signal.

Instead of implicitly determining a waveform based on a PMI, the UE may analyze RB allocation information and a PMI included in DCI in a different manner according to the values of the waveform indication field transmitted from the BS. For example, the UE may analyze the RB allocation information and PMI included in the DCI based on the waveform indication field as shown in Table 1 below. Here, the waveform indication field may be included in the DCI, but the present disclosure is not limited thereto. In Table 1, the bitmap scheme may mean distributed resource allocation.

TABLE 1

| Waveform indication | RB allocation information | PMI |
| --- | --- | --- |
| 0 (DFT-s-OFDM waveform) | RB allocation information is interpreted by assuming a localized method | PMI 0 (PMI 0 for DFT-s-OFDM waveform is used (e.g., antenna selection)) |
| 1 (CP-OFDM waveform) | RB allocation information is interpreted by assuming a bitmap method | PMI 0 (PMI 0 for CP-OFDM waveform is used) |

In addition, the UE can maintain the low PAPR characteristics using various methods including the DFT-s-OFDM. For example, the UE may reduce PAPR by applying various methods such as peak cancellation, companding, etc. to the CP-OFDM waveform.

According to an embodiment of the present disclosure, a UE can be classified into two types depending on how PAPR is reduced. The first type of UE uses the DFT-s-OFDM waveform, and the second type of UE uses a CP-OFDM waveform where a PAPR reduction scheme is applied. Since the BS may use different reception procedures for the two types, the BS should be able to know which type of UE a corresponding UE is.

If the BS indicates the UE to use a waveform with low PAPR, the UE may determine whether to use the DFT-s-OFDM waveform or CP-OFDM waveform with low PAPR and then inform the BS of the determined waveform.

Alternatively, even when the BS indicates to use the DFT-s-OFDM waveform, if the UE is able to support the CP-OFDM waveform with low PAPR, the UE may inform the BS that the UE can use the CP-OFDM waveform with low PAPR and then perform transmission using the corresponding waveform.

Meanwhile, during the initial access procedure, the UE may inform the BS that the UE has a capability of using the CP-OFDM waveform with low PAPR through higher layer signaling (e.g., RRC signaling) or a physical layer signal. Alternatively, the UE may transmit information indicating whether the CP-OFDM waveform with low PAPR is supported or not by including the information in an RACH preamble. For example, an RACH preamble sequence for a UE that supports the CP-OFDM waveform with low PAPR may be defined separately from that for a UE that does not support the CP-OFDM waveform with low PAPR.

In addition, during the random access procedure, even if the BS instructs a UE to use the DFT-s-OFDM waveform through message 2, the BS may perform blind detection to know which one of the DFT-s-OFDM waveform and CP-OFDM waveform with low PAPR the UE uses to transmit message 3. If message 3 is blind-detected based on the CP-OFDM waveform with low PAPR, the BS may know that the corresponding UE supports the CP-OFDM waveform with low PAPR.

Figure 14:
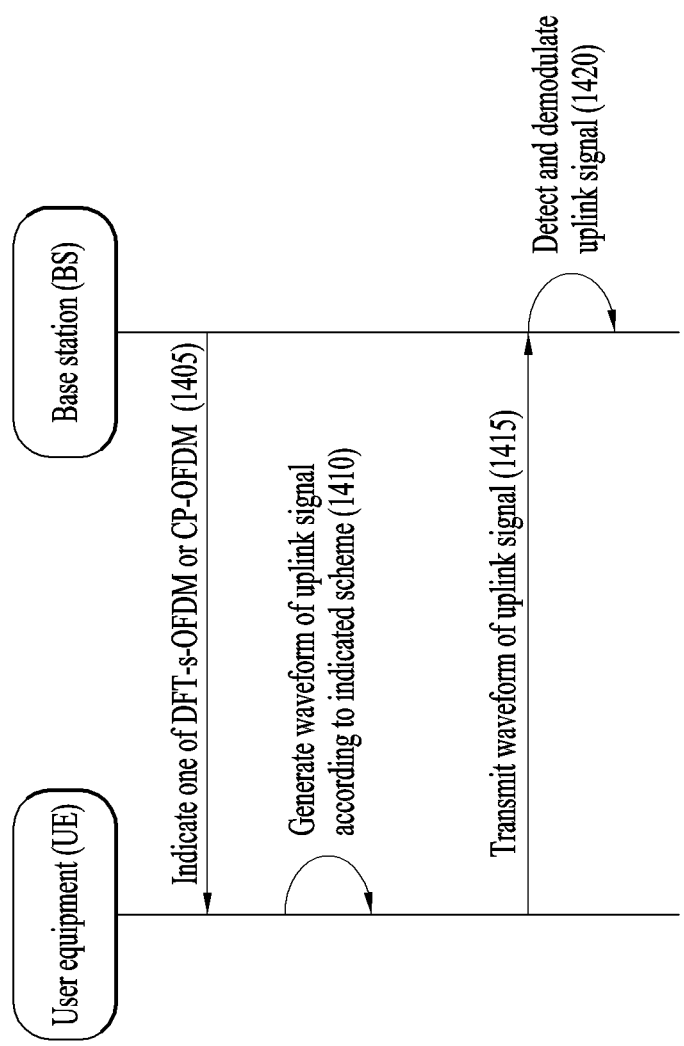
FIG. 14 is a flowchart illustrating an uplink signal transmission and reception method between a user equipment and a base station according to an embodiment of the present disclosure.

FIG. 14 is a flowchart illustrating an uplink signal transmission and reception method between a UE and a BS according to an embodiment of the present disclosure. Redundant description will be omitted.

Referring to FIG. 14, a UE receives from a BS information indicating one of a Cyclic Prefix-Orthogonal Frequency Divisional Multiplexing (CP-OFDM) scheme or a Discrete Fourier Transform-spreading-OFDM (DFT-s-OFDM) scheme [1405].

The UE generates a waveform of a UL signal according to the scheme indicated by the received information [1410]. For example, the UE modulates the UL signal and generates a CP-OFDM waveform or a DFT-s-OFDM waveform based on the modulated uplink signal. In this case, the UE may be allowed to modulate the uplink signal using a modulation scheme with the lowest modulation order only when the UE generates the waveform of the uplink signal according to the DFT-s-OFDM scheme.

The UE transmits the generated waveform of the uplink signal to the BS [1415].

The BS detects and demodulates the waveform of the uplink signal transmitted from the UE by assuming the scheme indicated by the BS [1420]. The BS may be allowed to demodulate the uplink signal by assuming a modulation scheme with the lowest modulation order only when the BS indicates the DFT-s-OFDM scheme.

For example, the information indicating either the CP-OFDM scheme or the DFT-s-OFDM scheme may be included in system information periodically broadcast by the BS. The UE may transmit a random access preamble in a first message and receive a second message in response to the random access preamble. Here, the uplink signal is a third message for resolving contention between UEs. When the UE transmits the third message after receiving the second message, the UE may apply the one indicated by the BS of the CP-OFDM scheme or the DFT-s-OFDM scheme.

When the waveform of the uplink signal is generated according to the CP-OFDM scheme, both distributed resource allocation and localized resource allocation may be supported for the uplink signal. On the other hand, when the waveform of the uplink signal is generated according to the DFT-s-OFDM scheme, only the localized resource allocation may be supported for the uplink signal.

As another example, the information indicating either the CP-OFDM scheme or the DFT-s-OFDM scheme may be received via DCI corresponding to an uplink grant for the uplink signal. The uplink signal may correspond to a Physical Uplink Shared Channel (PUSCH). One of the CP-OFDM scheme or the DFT-s-OFDM scheme may be implicitly indicated by at least one of Modulation and Coding Scheme (MCS) information, distributed/localized resource allocation information, and precoding information included in the DCI.

Alternatively, the information indicating either the CP-OFDM scheme or the DFT-s-OFDM scheme may be determined based on power headroom of the UE.

Figure 15:
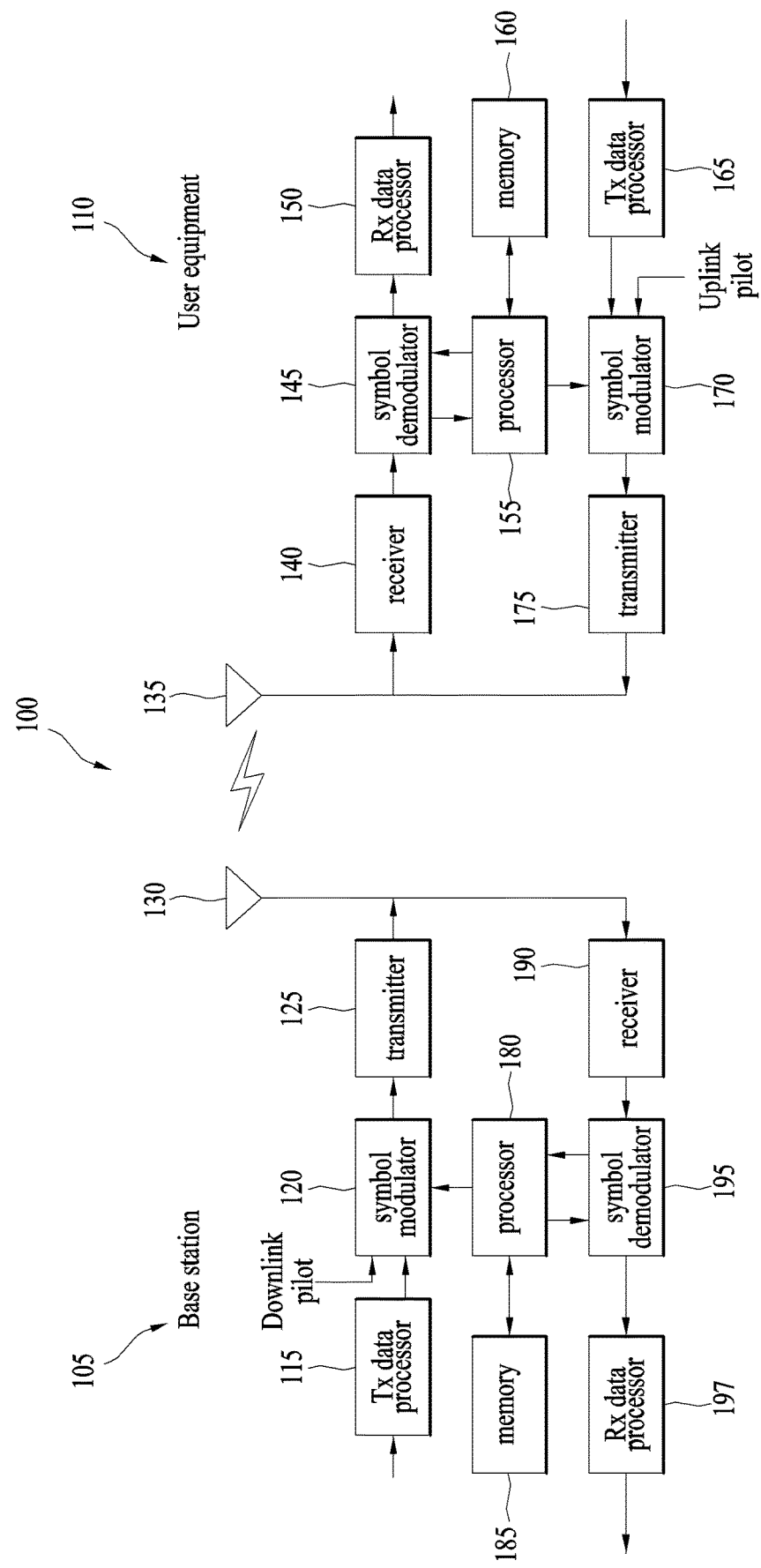
FIG. 15 illustrates a user equipment and a base station according to an embodiment of the present disclosure.

FIG. 15 is a block diagram for configurations of an eNB 105 and a user equipment 110 in a wireless communication system 100.

Although one eNB 105 and one user equipment 110 (D2D user equipment included) are shown in the drawing to schematically represent a wireless communication system 100, the wireless communication system 100 may include at least one eNB and/or at least one user equipment.

Referring to FIG. 15, an eNB 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the eNB/user equipment 105/110 includes one antenna 130/135 in the drawing, each of the eNB 105 and the user equipment 110 includes a plurality of antennas.

Therefore, each of the eNB 105 and the user equipment 110 of the present invention supports an MIMO (multiple input multiple output) system. And, the eNB 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the eNB and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the eNB 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/eNB 110/105 directs operations (e.g., control, adjustment, management, etc.) of the user equipment/eNB 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/eNB and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and an eNB may be able to exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

What is claimed is:

1. A method of transmitting uplink signals during a contention-based random access procedure by a user equipment in a wireless communication system, the method comprising:
    receiving, from a base station, system information including information indicating one of a cyclic prefix-orthogonal frequency divisional multiplexing (CP-OFDM) scheme or a discrete Fourier transform-spreading-OFDM (DFT-s-OFDM) scheme;
    transmitting, to the base station, a random access preamble;
    receiving, from the base station, a second message in response to the random access preamble; and
    transmitting a third message in response to the second message to the base station based on the indicated scheme among the CP-OFDM scheme and the DFT-s-OFDM scheme.

2. The method of claim 1, wherein applying a modulation scheme with a lowest modulation order to the transmission of the third message is allowed only when the DFT-s-OFDM scheme is indicated.

3. The method of claim 1, wherein the system information is periodically broadcasted by the base station.

4. The method of claim 1, wherein based on a waveform of the third message being generated according to the CP-OFDM scheme, both distributed resource allocation and localized resource allocation are supported for transmitting the third message, and
    wherein based on the waveform of the third message being generated according to the DFT-s-OFDM scheme, only the localized resource allocation is supported for transmitting the third message.

5. The method of claim 1, wherein the third message is transmitted through a physical uplink shared channel (PUSCH).

6. A user equipment configured to operate in a wireless communication system, the user equipment comprising:
    a receiver;
    a transmitter; and
    a processor operatively connected to the receiver and the transmitter and configured to:
    receive, from a base station, system information including information indicating one of a cyclic prefix-orthogonal frequency divisional multiplexing (CP-OFDM) scheme or a discrete Fourier transform-spreading-OFDM (DFT-s-OFDM) scheme;
    transmit, to the base station, a random access preamble;
    receive, from the base station, a second message in response to the random access preamble; and
    transmit a third message in response to the second message to the base station based on the indicated scheme among the CP-OFDM scheme and the DFT-s-OFDM scheme.

7. The user equipment of claim 6, wherein applying a modulation scheme with a lowest modulation order to the transmission of the third message is allowed only when the DFT-s-OFDM scheme is indicated.

8. The user equipment of claim 6, wherein the system information is periodically broadcasted by the base station.

9. The user equipment of claim 6, wherein based on a waveform of the third message being generated according to the CP-OFDM scheme, both distributed resource allocation and localized resource allocation are supported for transmitting the third message, and
    wherein based on the waveform of the third message being generated according to the DFT-s-OFDM scheme, only the localized resource allocation is supported for transmitting the third message.

10. The user equipment of claim 6, wherein the third message is transmitted through a physical uplink shared channel (PUSCH).

11. A method of receiving uplink signals during a contention-based random access procedure by a base station in a wireless communication system, the method comprising:
    transmitting, to a user equipment, system information including information indicating one of a cyclic prefix-orthogonal frequency divisional multiplexing (CP-OFDM) scheme or a discrete Fourier transform-spreading-OFDM (DFT-s-OFDM) scheme;
    receiving, from the user equipment, a random access preamble;
    transmitting, to the user equipment, a second message in response to the random access preamble; and
    receiving a third message in response to the second message from the user equipment based on the indicated scheme among the CP-OFDM scheme and the DFT-s-OFDM scheme.

12. The method of claim 11, wherein applying a modulation scheme with a lowest modulation order to the reception of the third message is allowed only when the DFT-s-OFDM scheme is indicated.

13. The method of claim 11, wherein the system information is periodically broadcasted by the base station.

14. The method of claim 11, wherein based on the base station indicating the CP-OFDM scheme, both distributed resource allocation and localized resource allocation are supported for the third message, and
    wherein based on the base station indicating the DFT-s-OFDM scheme, only the localized resource allocation is supported for the third message.

15. The method of claim 11, wherein the third message is received through a physical uplink shared channel (PUSCH).

* * * * *